3,151,142
REDISTRIBUTION OF ALKYL RADICALS IN
ALKYL LEAD COMPOSITIONS
Fred S. Arimoto, Newark, Del., assignor to E. I. du Pont de Nemours and Company, Wilmington, Del., a corporation of Delaware
No Drawing. Filed Mar. 14, 1961, Ser. No. 95,511
2 Claims. (Cl. 260—437)

This invention relates to the preparation of antiknock compositions for use in gasoline, comprised essentially of tetraalkyl lead redistribution mixtures and halohydrocarbon scavengers for the lead. The invention relates more particularly to a process for preparing tetraethyl lead and tetramethyl lead redistribution mixtures in the presence of ethylene dihalide scavenging agents which serve as solvents in the reaction.

Tetraalkyl leads are well-known antiknock agents. While tetraethyl lead has in general been used over the years, tetramethyl lead and mixtures of tetramethyl and tetraethyl lead are also known to have special value in gasoline. For such use, the tetraalkyl lead is normally blended with other agents according to standard specifications, the blends being comprised generally of one or more of the tetraalkyl lead compounds, a halohydrocarbon scavenger for the lead, an identifying dye, and an inert solvent such as kerosene. Most commonly used as scavengers are ethylene dibromide and ethylene dichloride.

While mixed alkyl lead compounds can be produced by alkylating sodium lead alloys with mixtures of ethyl and methyl halides, they may be prepared by subjecting a mixture of tetramethyl lead and tetraethyl lead to a redistribution process wherein the alkyl radicals are caused to interchange between the different alkyl lead molecules. This reaction may be carried out by adding a catalyst as more particularly described in U.S.P. 2,270,108. Aluminum chloride has, in general, been used in this process at somewhat elevated temperatures. Inert solvents have also been disclosed as useful in the process, although they are not necessary.

Since the presence of the halohydrocarbons as scavenger agents, such as ethylene dibromide, raises the flash point of the antiknock composition, it would be desirable to carry out the redistribution in the presence of such scavenger agents as the solvents for the reaction. However, it has been found that, when aluminum chloride is used as the catalyst in the presence of scavenger agents such as ethylene dichloride and ethylene dibromide, in amounts corresponding to those normally present in the antiknock fluid, the reaction does not go to completion even after an extended period of time. By "completion" is meant to the point where all the possible tetraalkyl leads in the mixture reach the statistical equilibrium theoretically possible and which is ordinarily reached in an inert solvent.

Among the drawbacks experienced in the process of U.S. Patent 2,270,108 is the fact that aluminum chloride is a solid and must be added as such or as a slurry in in an inert carrier solvent. It is also known to react violently with tetraalkyl lead with the liberation of heat. Since alkyl lead, particularly tetramethyl lead, is thermally unstable great care must be taken to avoid undue temperature rises and particularly local overheating which may occur when a solid catalyst such as aluminum chloride is used.

Among the products of the alkyl lead aluminum chloride interaction are alkyl aluminum sesquihalides which are particularly objectionable since they are spontaneously inflammable to air. This makes the use of aluminum chloride as a catalyst definitely a fire and explosion hazard. The use of aluminum chloride also tends to form solid by-products in the reaction which tend to plug the feed and outlet lines. With the use of aluminum chloride considerable loss in yields of tetraalkyl lead is also experienced due to the formation of by-products. Furthermore, when aluminum chloride is used the reaction mixture is corrosive to the equipment, and unless the aluminum compounds are completely washed from the resulting tetraalkyl lead the resulting product is corrosive and unstable on storage.

It is therefore an object of the present invention to provide a method for carrying out the redistribution of alkyl radicals of the alkyl lead compounds, containing at least two different alkyl groups, in the presence of halohydrocarbon compounds of the group consisting of ethylene dichloride, ethylene dibromide and mixtures thereof, and in which the redistribution reaches substantially statistical equilibrium in an extremely short period of time, at ordinary atmospheric temperature.

It has been found that redistribution of the alkyl groups in solvent solutions of tetraalkyl leads, wherein the normally used lead scavenger agents such as ethylene dichloride and ethylene dibromide are present as at least part of the solvent, can be effected in an extremely short period of time and at ordinary atmospheric temperatures by the use of boron trifluoride.

The following example is given to more fully illustrate the invention, in which the parts and percentages are by weight.

*Example 1*

To an agitated mixture of 1 mol of tetraethyl lead, 1 mol of tetramethyl lead (the tetramethyl lead is introduced as 80% solution in toluene), ½ mol of ethylene dichloride and ¼ mol of ethylene dibromide, is added 0.3 weight percent of boron trifluoride, based on the alkyl lead present. The reaction is carried out at room temperature. After one minute, the reaction mixture is washed with alkaline solution (1% aqueous sodium hydroxide) to remove the catalyst, then the washed mixture of alkyl leads is blended in the usual manner with the antioxidant and dye normally employed.

Analysis of the redistributed mixture is as follows:

| Tetraalkyl lead: | Mol percent |
|---|---|
| Tetramethyl | 5 |
| Trimethylethyl | 24 |
| Dimethyldiethyl | 41 |
| Methyltriethyl | 26 |
| Tetraethyl | 4 |

In the above reaction, the antioxidant and dye may be present during the redistribution.

As will be apparent from the above example, it is possible to carry out the redistribution merely by adding boron trifluoride directly to an already prepared pre-mix of tetraalkyl leads in which there are present at least two different alkyl groups, and in which the scavenger, antioxidant and dye are also present.

The same results as those illustrated in the above example can be obtained where other proportions of ethylene dibromide or ethylene dichloride, or mixtures thereof, are used. Ordinarily there will be present in any tetraalkyl lead pre-mix from 0.5 to 2.5 theories of the halohydrocarbon scavenger. The amount of halohydrocarbon scavenger is preferably from 1 to 2 theories, based on the amount of lead present.

The boron trifluoride should be used in amounts ranging from about 0.05 to 2.0% by weight, based on the tetraalkyl lead present. The preferred range is between about 0.1 and 0.5 weight percent.

Other inert solvents than the scavenger itself may of course be present, such as toluene, hexane, or other hydrocarbon solvents, including gasoline and kerosene, since inert solvents do not materially alter the speed or character of the redistribution reaction.

It is well known that by changing the proportions of a mixture of alkyl lead compounds one obtains different proportions of products in the distribution mixture. The present invention can be employed in carrying out the redistribution of alkyl groups in mixtures of any proportions. In place of the 50:50 molar mixture used in the above example, there may be used other mixtures such as those composed of 25 to 75 mol percent of tetramethyl lead and 75 to 25 mol percent of tetraethyl lead to produce equilibrium redistribution mixtures useful as antiknock agents. Likewise, the catalysts of this invention effect redistribution of alkyl groups in an alkyl lead which contains at least two different alkyl groups in the molecule, such as dimethyldiethyl lead, monomethyltriethyl lead, etc. The resulting effect is the same as if two different alkyl leads were used in proportion, providing the same number of the different alkyl groups.

It has been found that the redistribution of the alkyl groups on the lead takes place almost instantaneously with boron trifluoride; however, the time of reaction disclosed in the example can be varied widely since the presence of the boron trifluoride is not detrimental even if allowed to remain in the tetraalkyl mixture. Because of the rapidity with which redistribution takes place, this process can be carried out in a continuous manner by feeding the boron trifluoride into a stream of the alkyl lead and scavenger mixtures, preferably in a pipeline reactor.

While ordinary atmospheric temperatures are preferred, the redistribution can be carried out at temperatures as low at 0° C. Temperatures higher than atmospheric do not materially enhance the reaction when boron triuoride is used.

Any haze that may result from the use of the borontrifluoride may be removed by ordinary filtration.

The boron trifluoride catalyst employed in the present invention does not form the very large amount of solid by-products normally occurring in the aluminum chloride reaction. Furthermore, the reaction mixture is non-corrosive to the ordinary steel equipment and does not produce a corrosive composition when the residue of the boron compound is left in the alkyl lead mixtures. While in the above example the treated material is subjected to an alkaline wash, this is primarily to produce a clear product; however, the unwashed product has been found to be entirely satisfactory for use since the boron compound or residues do not materially affect the quality of the tetraalkyl mixtures.

I claim:

1. A process for rapidly effecting at ordinary atmospheric temperatures the redistribution of alkyl radicals in alkyl lead compositions containing at least two different alkyl groups, which comprises contacting with boron trifluoride at ordinary atmospheric temperatures a solution of said alkyl lead composition in a halohydrocarbon scavenger of the group consisting of ethylene dichloride, ethylene dibromide, and mixtures thereof, and recovering an alkyl lead composition wherein the alkyl lead molecules contain only one Pb atom per molecule.

2. The process of claim 1 wherein the alkyl lead composition comprises a mixture of tetramethyl lead and tetraethyl lead.

References Cited in the file of this patent
UNITED STATES PATENTS

| | | |
|---|---|---|
| 2,270,108 | Calingaert et al. | Jan. 13, 1942 |
| 2,447,926 | Wiczer | Aug. 24, 1948 |